(12) United States Patent
Shibata et al.

(10) Patent No.: US 9,365,704 B2
(45) Date of Patent: Jun. 14, 2016

(54) RUBBER COMPOSITION, METHOD FOR PRODUCING SAME, AND TIRE

(75) Inventors: Masahiro Shibata, Tokyo (JP); Koji Okada, Tokyo (JP)

(73) Assignee: JSR CORPORATION, Tokyo (JP)

( * ) Notice: Subject to any disclaimer, the term of this patent is extended or adjusted under 35 U.S.C. 154(b) by 203 days.

(21) Appl. No.: 13/984,753

(22) PCT Filed: Feb. 9, 2012

(86) PCT No.: PCT/JP2012/052926
§ 371 (c)(1),
(2), (4) Date: Aug. 9, 2013

(87) PCT Pub. No.: WO2012/108487
PCT Pub. Date: Aug. 16, 2012

(65) Prior Publication Data
US 2013/0324659 A1    Dec. 5, 2013

(30) Foreign Application Priority Data

Feb. 9, 2011   (JP) ................. 2011-026043

(51) Int. Cl.
| *C08L 9/00* | (2006.01) |
| *C08L 15/00* | (2006.01) |
| *B60C 1/00* | (2006.01) |
| *C08K 3/36* | (2006.01) |

(52) U.S. Cl.
CPC .................. *C08L 9/00* (2013.01); *B60C 1/0016* (2013.04); *C08K 3/36* (2013.01); *C08L 15/00* (2013.01)

(58) Field of Classification Search
USPC ................................ 524/526, 572
See application file for complete search history.

(56) References Cited

U.S. PATENT DOCUMENTS

| 5,776,991 A * | 7/1998 | Teratani | ................ B60C 1/0016 264/45.1 |
| 6,740,700 B2 * | 5/2004 | Kobayashi | ................ C08J 3/20 524/401 |
| 2003/0065132 A1 * | 4/2003 | Bauerle | ................ C08F 214/265 528/401 |
| 2003/0125467 A1 * | 7/2003 | Akema | ................ C08K 3/0033 525/208 |
| 2005/0009979 A1 * | 1/2005 | Tanaka | ................ C08C 19/25 524/492 |
| 2006/0264560 A1 * | 11/2006 | Tanaka | ................ C08C 19/25 524/493 |
| 2008/0249240 A1 * | 10/2008 | Bandyopadhyay | ...... C08K 5/14 524/847 |
| 2010/0152370 A1 * | 6/2010 | Steinhauser | .......... C08L 19/006 524/572 |
| 2011/0146877 A1 * | 6/2011 | Tanaka | ..................... B60C 1/00 152/547 |

FOREIGN PATENT DOCUMENTS

| JP | 2005 8870 | 1/2005 |
| JP | 2010 95724 | 4/2010 |
| WO | 02 00779 | 1/2002 |
| WO | WO-02/00779 A1 * | 1/2002 |
| WO | WO 2009/113546 A1 | 9/2009 |
| WO | WO-2009/113546 A1 * | 9/2009 |

OTHER PUBLICATIONS

U.S. Appl. No. 14/007,156, filed Sep. 24, 2013, Okada, et al.
U.S. Appl. No. 13/984,749, filed Aug. 9, 2013, Shibata, et al.
U.S. Appl. No. 13/985,471, filed Aug. 14, 2013, Okada, et al.
International Search Report Issued Mar. 6, 2012 in PCT/JP12/52926 Filed Feb. 9, 2012.
Combined Office Action and Search Report issued on Dec. 31, 2014 in Chinese Patent Application No. 201280006881.7 with English translation.

* cited by examiner

*Primary Examiner* — Peter D Mulcahy
*Assistant Examiner* — Henry Hu
(74) *Attorney, Agent, or Firm* — Oblon, McClelland, Maier & Neustadt, L.L.P.

(57) ABSTRACT

A method for producing a rubber composition includes kneading: a rubber component comprising a conjugated diene polymer having at least one functional group selected from the group consisting of a thiol group, an oxetane group and a hydrocarbylthio group; silica particles; and a catalyst for condensing silanol to form an aggregate of the silica particles. Preferably, at least one polymer selected from the group consisting of a conjugate diene polymer having no functional group bondable to silica, and a polymer having no functional group bondable to silica and the polymer being other than conjugated diene polymer is also kneaded as a rubber component other than the conjugated diene polymer.

15 Claims, No Drawings

RUBBER COMPOSITION, METHOD FOR PRODUCING SAME, AND TIRE

TECHNICAL FIELD

The present invention relates to a rubber composition, a method for producing the same, and a tire, and more particularly, for example, to a rubber composition suitable for tire tread use, a method for producing the same, and a tire obtained from the rubber composition.

BACKGROUND ART

As a rubber composition used for tire treads of automobiles, there has conventionally been known one in which carbon black is blended as a reinforcing agent together with a rubber component composed of a conjugated diene rubber.

Further, with a recent increasing demand for a reduction in fuel consumption of automobiles, in order to comply with such a demand, for the purpose of a reduction in rolling resistance of tires, silica has been used as a reinforcing agent.

Then, in the rubber composition in which silica is blended as the reinforcing agent, the silica particles are liable to coagulate with each other and less likely to be uniformly dispersed. Accordingly, in order to solve such a problem, various proposals have been made (for example, see Patent Document 1 and Patent Document 2).

PRIOR-ART DOCUMENTS

Patent Documents

Patent Document 1: JP-A-2010-95724
Patent Document 2: WO02/00779

SUMMARY OF THE INVENTION

Problems to be Solved by the Invention

Then, inventors of the present invention have made intensive studies of rubber compositions in which silica is blended as a reinforcing agent. As a result, it has become clear that when dispersibility of silica in the rubber compositions is excessively increased, there is a problem of failing to obtain sufficient impact resilience in rubber elastic bodies obtained from the rubber compositions.

The present invention has been made on the basis of the circumstances as described above, and an object thereof is to provide a rubber composition that can obtain a rubber elastic body having small rolling resistance and moreover excellent impact resilience and a method for producing the same.

Further, another object of the present invention is to provide a tire having small rolling resistance and moreover excellent impact resilience.

Means for Solving the Problems

A method for producing a rubber composition of the present invention comprises kneading a rubber component comprising a conjugated diene polymer having at least one functional group selected from the group consisting of a tertiary amino group, a thiol group, an epoxy group, a thioepoxy group, an oxetane group and a hydrocarbylthio group, a catalyst for condensing silanol, and silica.

In the method for producing a rubber composition of the present invention, it is preferable that a polymer having no functional group bondable to silica is kneaded as a rubber component other than above-mentioned conjugated diene polymer, together with above-mentioned conjugated diene polymer, above-mentioned catalyst and above-mentioned silica.

Additionally, it is preferable that above-mentioned polymer having no functional group bondable to silica, a part or the whole of above-mentioned silica used and above-mentioned catalyst are kneaded to add the conjugated diene polymer thereto, followed by kneading.

A rubber composition of the present invention is obtained by kneading a rubber component comprising a conjugated diene polymer having at least one functional group selected from the group consisting of a tertiary amino group, a thiol group, an epoxy group, a thioepoxy group, an oxetane group and a hydrocarbylthio group, a catalyst for condensing silanol, and silica.

It is preferable that the rubber composition of the present invention is obtained by kneading a polymer having no functional group bondable to silica, as a rubber component other than above-mentioned conjugated diene polymer, together with above-mentioned conjugated diene polymer, above-mentioned catalyst and above-mentioned silica.

Additionally, it is preferable that the rubber composition is obtained by kneading above-mentioned polymer having no functional group bondable to silica, a part or the whole of above-mentioned silica used and above-mentioned catalyst to add above-mentioned conjugated diene polymer thereto, followed by kneading.

Additionally, in a rubber composition of the present invention, at least a catalyst for condensing silanol and silica are added to a rubber component comprising a conjugated diene polymer having at least one functional group selected from the group consisting of a tertiary amino group, a thiol group, an epoxy group, a thioepoxy group, an oxetane group and a hydrocarbylthio group.

A tire of the present invention comprises a tread obtained from the rubber composition described above.

Effect of the Invention

According to a method for producing a rubber composition of the present invention, since a rubber component containing a conjugated diene polymer having a specific functional group bondable to silica, a catalyst for condensing silanol and silica are kneaded, the specific functional group in the conjugated diene polymer is bonded to silica, thereby improving dispersibility of silica. At the same time, silanol groups in the silica are condensed among the Silica particles with the catalyst for condensing silanol, thereby forming a silica aggregate. As a result, silica is suppressed from being excessively dispersed.

According to the rubber composition of the present invention, since the conjugated diene polymer having the specific functional group bondable to silica is contained as the rubber component, dispersibility of silica is improved by bonding of the functional group to silica, thereby improving the dispersibility of silica. Moreover, since the catalyst for condensing silanol is contained, the silanol groups in the silica are condensed among the silica particles, thereby forming the silica aggregate. As a result, silica is suppressed from being excessively dispersed. Therefore, an elastic body having small rolling resistance and moreover excellent impact resilience can be obtained.

Accordingly, the rubber composition of the present invention is suitable as a rubber composition for obtaining tire treads.

MODES FOR CARRYING OUT THE INVENTION

Modes for carrying out the present invention will be described below.

A rubber composition of the present invention is one in which at least component (B) composed of a catalyst for condensing silanol and component (C) composed of silica are added to a rubber composition containing component (A) composed of a conjugated diene polymer (hereinafter referred to as the conjugated diene polymer containing the specific functional group) having a functional group described later. Further, in the rubber composition of the present invention, further, in the rubber composition of the present invention, component (D) composed of a polymer containing no specific functional group is contained together with the component (A) to component (C), if necessary, as a rubber component other than the component (A).

<Component (A)>

The conjugated diene polymer containing the specific functional group as component (A) constitutes the rubber component in the rubber composition of the present invention. The conjugated diene polymer containing the specific functional group can remove a low-molecular-weight component which causes deterioration in rolling resistance, since its molecular weight distribution is easily controlled.

In such the conjugated diene polymer containing the specific functional group, a copolymer of a conjugated diene compound and an aromatic vinyl compound can be used as the conjugated diene polymer acting as a base polymer.

As the conjugated diene compounds, 1,3-butadiene, isoprene, 1,3-pentadiene, 2,3-dimethyl-1,3-butadiene, 2-phenyl-1,3-butadiene, 1,3-hexadiene and the like may be used either alone or as a combination of two or more thereof. Of these, 1,3-butadiene, isoprene and 2,3-dimethyl-1,3-butadiene are preferable.

Further, as the aromatic vinyl compounds, styrene, α-methylstyrene, 1-vinylnaphthalene, 3-vinyltoluene, ethylvinylbenzene, divinylbenzene, 4-cyclohexylstyrene, 2,4,6-trimethylstyrene, tert-butoxydimethylsilylstyrene, isopropoxydimethylsilylstyrene and the like may be used either alone or as a combination of two or more thereof. Of these, styrene is preferable.

Preferable specific examples of the conjugated diene polymers acting as the base polymer include butadiene polymers, styrene-butadiene copolymers, butadiene-isoprene copolymers, styrene-isoprene copolymers, styrene-butadiene-isoprene copolymers and the like.

The conjugated diene polymer containing the specific functional group has at least one functional group (hereinafter referred to as "the specific functional group") selected from the group consisting of a tertiary amino group, a thiol group, an epoxy group, a thioepoxy group, an oxetane group and a hydrocarbylthio group, and these specific functional groups are bondable (including covalent bonding, hydrogen bonding and an interaction by molecular polarity) to a silanol group in silica.

Methods for introducing the specific functional group into the conjugated diene polymer as the base polymer include a method of polymerizing monomers for obtaining the conjugated diene polymer as the base polymer, for example, the conjugated diene compound and the aromatic vinyl compound, by living ion polymerization, and terminating the polymerization using a compound (hereinafter referred to as "the compound containing the specific functional group") having a specific functional group as a polymerization terminator; a method of copolymerizing monomers for obtaining the conjugated diene polymer as the base polymer, for example, the conjugated diene compound, the aromatic vinyl compound and a monomer (hereinafter referred to as "the monomer containing the specific functional group") copolymerizable with a conjugated diene compound having a specific functional group, and the like.

Specific examples of the compounds containing the specific functional group include N-[3-(trimethoxysilyl)-propyl]-N,N'-diethyl-N'-trimethylsilyl-ethane-1,2-diamine, N-[3-(triethoxysilyl)-propyl]-N,N'-diethyl-N'-trimethylsilyl-ethane-1,2-diamine, N-[3-(methyldimethoxysilyl)-propyl]-N,N'-diethyl-N'-trimethylsilyl-ethane-1,2-diamine, N-[3-(methyldimethoxysilyl)-propyl]-N,N'-diethyl-N'-trimethylsilyl-p-phenylenediamine, N-[3-(triethoxysilyl)-propyl]-N,N'-diethyl-N'-trimethylsilyl-p-phenylenediamine, N-[3-(diethoxy-methylsilyl)-propyl]-N-ethyl-N'-(2-ethoxyethyl)-N'-trimethylsilyl-ethane-1,2-diamine, N-[3-(tripropoxysilyl)-propyl]-N-propyl-N'-(2-ethoxyethyl)-N'-triethylsilyl-p-phenylenediamine, N-[2-(diethoxymethylsilyl)-1-methylethyl]-N-ethyl-N'-(2-diethylamino-ethyl)N'-triethylsilylethane-1,2-diamine, N-[3-(triethoxysilyl)-propyl]-N-ethyl-N'-(2-diethylaminoethyl)-N'-triethylsilylethane-1,2-diamine, N-[2-(trimethoxysilyl)-ethyl]-N,N',N'-trimethylethane-1,2-diamine, N-[2-(dimethoxymethylsilyl)-ethyl]-N-ethyl-N',N'-dimethylethane-1,2-diamine, N-[3-(trimethoxysilyl)-propyl]-N,N',N'-trimethylpropane-1,3-diamine, N-[3-(dimethoxymethylsilyl)-propyl]-N-ethyl-N,N'-dimethylpropane-1,3-diamine, N-[3-(dimethoxymethylsilyl)-propyl]-N-ethyl-N,N'-dimethylpropane-1,3-diamine, N-[3-(triethoxysilyl)-propyl]-N,N',N'-triethyl-2-methyl-propane-1,3-diamine, N-[3-(dimethoxymethylsilyl)-propyl]-2,N,N',N'-tetramethylpropane-1,3-diamine, N-(2-dimethylaminoethyl)-N'-[2-(trimethoxy-silyl)-ethyl]-N,N'-dimethylethane-1,2-diamine, N-[2-(diethoxypropylsilyl)-ethyl]-N'-(3-ethoxypropyl-N,N'-dimethylethane-1,2-diamine, N-[2-(trimethoxysilyl)-ethyl]-N'-methoxymethyl-N,N'-dimethylethane-1,2-diamine, N-[2-(trimethoxysilyl)-ethyl]-N,N'-dimethyl-N'-(2-trimethyl silylethyl)-ethane-1,2-diamine, N-[2-(triethoxysilyl)-ethyl]-N,N'-diethyl-N'-(2-dibutylmethoxysilylethyl)-ethane-1,2-diamine, 1-(3-triethoxysilylpropyl)-2,2,5,5-tetramethyl-1-aza-2,5-disilacyclopentane, 1-(3-trimethoxysilylpropyl)-2,2,5,5-tetramethyl-1-aza-2,5-disilacyclopentane, 1-(3-methyldiethoxysilylpropyl)-2,2,5,5-tetramethyl-1-aza-2,5-disilacyclopentane, 1-(3-methyldimethoxysilylpropyl)-2,2,5,5-tetramethyl-1-aza-2,5-disilacyclopentane, 1-trimethylsilyl-2,2-dimethoxy-1-aza-2-silacyclopentane, 3-[3-(trimethylsilylethylamino)-1-pyrrolidinyl]-propyl-methyldiethoxysilane, 3-[3-(trimethylsilylpropylamino)-1-pyrrolidinyl]-propyl-triethoxysilane, 3-(4-trimethylsilyl-1-piperazino)propylmethyldimethoxysilane, 3-(4-trimethylsilyl-1-piperazino)propyltriethoxysilane, 3-(4-trimethylsilyl-1-piperazino)propyltributoxysilane, 4-(4-trimethylsilyl-1-piperazinyl)butyltriethoxysilane, 1-[3-(triethoxysilyl)-propyl]-4-methylpiperazine, 1-[3-(diethoxyethylsilyl)-propyl]-4-methylpiperazine, 2-(triethoxysilyl)-1,4-diethylpiperazine, 2-(dimethoxymethylsilyl)-1,4-dimethylpiperazine, 2-(3-triethoxysilyl-propyl)-1,4-diethylpiperazine, 2-(3-dimethoxymethylsilyl-propyl)-1,4-dimethylpiperazine, 3-piperidinopropyltrimethoxysilane, 3-piperidinopropyltriethoxysilane, 3-piperidinopropylmethyldimethoxysilane, 3-piperidinopropylethyldimethoxysilane, 3-piperidinopropylmethyldiethoxysilane, 3-piperidinopropylethyldiethoxysilane, 3-(3-trimethylsilyl-1-imidazolidinyl)propylethyldiethoxysilane, 3-(3-trimethylsilyl-1-imidazolidinyl)propyltriethoxysilane, 1-[3-(trimethoxysilyl)-propyl]-3-methylimidazolidine, 1-[3-(diethoxyethylsilyl)-propyl]-3-ethylimidazolidine, 1-(2-ethoxyethyl)-3-[3-(trimethoxysilyl)-propyl]-imidazolidine, 2-(trimethylsilyl)-1,3-dimethylimidazolidine, 2-(3-trimethoxysilyl-propyl)-1,3-dimethylimidazolidine, 2-(diethoxyethylsilyl)-1,3-diethylimidazolidine, 2-[3-(2-dimethylaminoethyl)-2-(ethyldimethoxysilyl)-imidazolidine-1-yl]-ethyl-dimethylamine, 2-(3-diethoxyethylsilyl-propyl)-1,3-diethylimidazolidine, 2-[3-(2-dimethylaminoethyl)-2-(3-ethyldimethoxysilyl-propyl)-imidazolidine-1-yl]-ethyl-dimethylamine, N-(3-trimethoxysilylpropyl)-4,5-dihydroimidazole, N-(3-triethoxysilylpropyl)-4,5-dihydroimidazole, N-(3-trimethoxysilylpropyl)-4,5-imidazole, N-(3-triethoxysilylpropyl)-4,5-imidazole, 3-(3-trimethylsilyl-1-hexahydropyrimidinyl)propylmethyldimethoxysilane, 3-(3-trimethylsilyl-1-hexahydropyrimidinyl)propyltriethoxysilane, 1-[3-(triethoxysilyl)-propyl]-3-methylhexahydropyrimidine, 1-[3-(dimethoxymethylsilyl)-propyl]-3-methylhexahydropyrimidine, 3-[3-(tributoxysilyl)-propyl]-1-methyl-1,2,3,4-tetrahydropyrimidine, 3-[3-(dimethoxymethylsilyl)-propyl]-1-ethyl-1,2,3,4-tetrahydropyrimidine, 2-{3-[3-(trimethoxysilyl)-propyl]-tetrahydropyrimidine-1-yl}-ethyldimethylamine, 5-(triethoxysilyl)-1,3-dipropylhexahydropyrimidine, 5-(diethoxyethylsilyl)-1,3-diethylhexahydropyrimidine, 5-(trimethoxysilyl)-1,3-bis-(2-methoxyethyl)-hexahydropyrimidine, 5-(ethyldimethoxysilanyl)-1,3-bis-trimethylsilanylhexahydropyrimidine, 5-(3-triethoxysilyl-propyl)-1,3-dipropylhexahydropyrimidine, 5-(3-diethoxyethylsilyl-propyl)-1,3-diethylhexahydropyrimidine, 5-(3-trimethoxysilyl-propyl)-1,3-bis-(2-methoxyethyl)-hexahydropyrimidine, 5-(3-ethyldimethoxysilyl-propyl)-1,3-bis-(2-trimethylsilylethyl)-hexahydropyrimidine, 3-morpholinopropyltrimethoxysilane, 3-morpholinopropyltriethoxysilane, 3-morpholinopropylmethyldimethoxysilane, 3-morpholinopropylethyldimethoxysilane, 3-morpholinopropylmethyldiethoxysilane, 3-morpholinopropylethyldiethoxysilane, 3-hexamethyleneiminopropyltrimethoxysilane, 3-hexamethyleneiminopropyltriethoxysilane, 3-hexamethyleneiminopropylmethyldimethoxysilane, 3-hexamethyleneiminopropylethyldimethoxysilane, 3-hexamethyleneiminopropylmethyldiethoxysilane, 3-hexamethyleneiminopropylethyldiethoxysilane, 3-di(t-butyldimethylsilyl)aminopropyltrimethoxysilane, 3-di(t-butyldimethylsilyl)aminopropyltriethoxysilane, 3-di(t-butyldimethylsilyl)aminopropylmethyldimethoxysilane, 3-di(t-butyldimethylsilyl)aminopropylmethyldiethoxysilane, 3-di(t-butyldimethylsilyl)aminopropyldimethylmethoxysilane, 3-di(t-butyldimethylsilyl)aminopropyldimethylethoxysilane, N-(1,3-dimethylbutylidene)-3-(trimethoxysilyl)-1-propaneamine, N-(cyclohexylidene)-3-(trimethoxysilyl)-1-propaneamine, N-(cyclohexylidene)-3-(methyldiethoxysilyl)-1-propaneamine, N-(cyclohexylidene)-3-(ethyldimethoxysilyl)-1-propaneamine, [(3-methyl-3-ethylamino)propyl]trimethoxysilane, [(3-methyl-3-ethylamino)propyl]triethoxysilane, P,P-bis(trimethylsilyl)phosphinopropylmethyldimethoxysilane, P,P-bis(trimethylsilyl)phosphinopropyltrimethoxysilane, P,P-bis(trimethylsilyl)phosphinopropyltriethoxysilane, P,P-bis(trimethylsilyl)phosphinepropylmethyldiethoxysilane, P,P-bis(trimethylsilyl)-phosphinoethyltrimethoxysilane, P,P-bis(trimethylsilyl)phosphinoethyltriethoxysilane, P,P-bis(trimethylsilyl)phosphinoethylmethyldimethoxysilane, P,P-bis(trimethylsilyl)phosphinoethylmethyldiethoxysilane, 3-dimethylphosphinopropyltrimethoxysilane, 3-diethylphosphinopropyltrimethoxysilane, 3-dimethylphosphinopropyltriethoxysilane, 3-diethylphosphinopropyltriethoxysilane, 3-ethylmethylphosphinopropyltrimethoxysilane, 3-ethylmethylphosphinopropyltriethoxysilane, 3-dimethylphosphinopropylmethyldimethoxysilane, 3-diethylphosphinopropylmethyldimethoxysilane, 3-dimethylphosphinopropylethyldimethoxysilane, 3-diethylphosphinopropylethyldimethoxysilane, 3-dimethylphosphinopropyldimethylmethoxysilane, 3-dimethylphosphinopropyldiethylmethoxysilane, 3-diethylphosphinopropyldimethylmethoxysilane, 3-diethylphosphinopropyldiethylmethoxysilane, 3-ethylmethylphosphinopropylmethyldimethoxysilane, 3-ethylmethylphosphinopropylethyldimethoxysilane, 3-dimethylphosphinopropylmethyldiethoxysilane, 3-diethylphosphinopropylmethyldiethoxysilane, 3-dimethylphosphinopropylethyldiethoxysilane, 3-diethylphosphinopropylethyldiethoxysilane, 3-dimethylphosphinopropyldimethylethoxysilane, 3-dimethylphosphinopropyldiethylethoxysilane, 3-diethylphosphinepropyldimethylethoxysilane, 3-diethylphosphinopropyldiethylethoxysilane, 3-ethylmethylphosphinopropylmethyldiethoxysilane, 3-ethylmethylphosphinopropylethyldiethoxysilane, 3-diphenylphosphinopropyltrimethoxysilane, 3-diphenylphosphinopropyltriethoxysilane, 3-diphenylphosphinepropylmeryldimethoxysilane, 3-diphenylphosphinopropylmeryldiethoxysilane, S-trimethylsilylmercaptopropylmethyldimethoxysilane, S-trimethylsilylmercaptopropyltrimethoxysilane, S-trimethylsilylmercaptopropyltriethoxysilane, S-trimethylsilylmercaptopropylmethyldiethoxysilane, S-trimethylsilylmercaptoethyltrimethoxysilane, S-trimethylsilylmercaptoethyltriethoxysilane, S-trimethylsilylmercaptoethylmethyldimethoxysilane, S-trimethylsilylmercaptoethylmethyldiethoxysilane and the like.

Of these, 1-(3-triethoxysilylpropyl)-2,2,5,5-tetramethyl-1-aza-2,5-disilacyclopentane, N,N',N'-tris(trimethylsilyl)-N-(2-aminoethyl)-3-aminopropyltriethoxysilane, 1-trimethylsilyl-2,2-dimethoxy-1-aza-2-silacyclopentane, N-[3-(trimethoxysilyl)-propyl]-N,N'-diethyl-N'-trimethylsilyl-ethane-1,2-diamine, N-[3-(triethoxysilyl)-propyl]-N,N'-diethyl-N'-trimethylsilyl-ethane-1,2-diamine, 3-(4-trimethylsilyl-1-piperazino)propyltriethoxysilane, N-[2-(trimethoxysilyl)-ethyl]-N,N',N'-trimethylethane-1,2-diamine, N-(1,3-dimethylbutylidene)-3-(trimethoxysilyl)-1-propaneamine, 1-[3-(triethoxysilyl)-propyl]-4-methylpiperazine, 2-(trimethoxysilyl)-1,3-dimethylimidazolidine, 2-(3-trimethoxysilyl-propyl)-1,3-dimethylimidazolidine, 3-dimethylaminopropyltrimethoxysilane, 3-diethylaminopropyltrimethoxysilane, 3-dimethylaminopropyltriethoxysilane, 3-diethylaminopropyltriethoxysilane, N-(3-trimethoxysilylpropyl)-4,5-dihydroimidazole, N-(3-triethoxysilylpropyl)-4,5-dihydroimidazole, N-(3-trimethoxysilylpropyl)-4,5-imidazole, N-(3-triethoxysilylpropyl)-4,5-imidazole, bis-(3-dimethylaminopropyl)-dimethoxysilane, [3-(diethylamino)propyl]trimethoxysilane, [3-(dimethylamino)propyl]triethoxysilane, 3-diphenylphosphinopropyltrimethoxysilane, 3-diphenylphosphinopropyltriethoxysilane, S-trimethylsilylmercaptopropylmethyldimethoxysilane, S-trimethylsilylmercaptopropyltrimethoxysilane, S-trimethylsilylmercaptopropyltriethoxysilane and S-trimethylsilylmercaptopropylmethyldiethoxysilane are preferable.

Further, specific examples of the monomers containing the specific functional group include, for example, 1-(4-N,N-dimethylaminophenyl)-1-phenylethylene, 1-(4-N,N-diethylaminophenyl)-1-phenyl ethylene, 1-(4-N,N-dipropylaminophenyl)-1-phenylethylene, 1-(4-N,N-dibutylaminophenyl)-1-phenylethylene, 1-(4-N,N-dimethoxyaminophenyl)-1-phenylethylene, 1-(4-N,N-diethoxyaminophenyl)-1-phenylethylene, 1-(4-N,N-dipropoxyaminophenyl)-1-phenylethylene, 1-(4-N,N-dibutoxyaminophenyl)-1-phenylethylene and the like. Of these, 1-(4-N,N-dimethylaminophenyl)-1-phenylethylene is preferable from the viewpoint that fuel efficiency is significantly improved.

In such a conjugated diene polymer containing the specific functional group, the 1,2-vinyl bond content in a structural unit derived from a conjugated diene compound is preferably from 30 to 70 mol %. When the 1,2-vinyl bond content is excessively small, there is a possibility that a balance between wet grip performance and rolling resistance in the rubber elastic body obtained from the rubber composition is deteriorated. On the other hand, when the 1,2-vinyl bond content is excessively large, there is a possibility that the rubber elastic body obtained from the rubber composition is extremely decreased in abrasion resistance.

Herein, the 1,2-vinyl bond content in the structural unit derived from the conjugated diene compound can be calculated from a 500 MHz, $^1$H-NMR spectrum.

<Component B>

The catalyst as component B has a function of condensing silanol groups in silica described later. As such a catalyst, a metal-containing acylate compound, an alkoxide or an acetylacetonato complex salt of a metal element, or the like can be used.

Herein, it is preferable that the metal element is a metal element contained in groups 4, 8, 12, 13, 14 and 15 in the periodic table, and preferred specific examples of such metal elements include titanium, iron, zirconium, aluminum, bismuth, tin and the like.

Specific examples of the metal-containing acylate compounds include titanium tetrakis(2-ethylhexanoate), titanium tetrakis(laurate), titanium tetrakis(naphthate), titanium tetrakis(stearate), titanium tetrakis(oleate), titanium tetrakis(linoleate), iron tris(2-ethylhexanoate), iron tris(laurate), iron tris(naphthate), iron tris(stearate), iron tris(oleate), iron tris(linoleate), zirconium tetrakis(2-ethylhexanoate), zirconium tetrakis(laurate), zirconium tetrakis(naphthate), zirconium tetrakis(stearate), zirconium tetrakis(oleate), zirconium tetrakis(linoleate), aluminum tris(2-ethylhexanoate), aluminum tris(laurate), aluminum tris(naphthate), aluminum tris(stearate), aluminum tris(oleate), aluminum tris(linoleate), bismuth tris(2-ethylhexanoate), bismuth tris(laurate), bismuth tris(naphthate), bismuth tris(stearate), bismuth tris(oleate), bismuth tris(linoleate), tin bis(n-octanoate), tin bis(2-ethylhexanoate), tin dilaurate, tin dinaphthenate, tin distearate, tin dioleate, titanium oxide bis(2-ethylhexanoate), titanium oxide bis(laurate), titanium oxide bis(naphthate), titanium oxide bis(stearate), titanium oxide bis(oleate), titanium oxide bis(linolate), zirconium oxide bis(2-ethylhexanoate), zirconium oxide bis(laurate), zirconium oxide bis(naphthate), zirconium oxide bis(stearate), zirconium oxide bis(oleate), zirconium oxide bis(linolate), dibutyltin diacetate, dibutyltin bis(n-octanoate), dibutyltin bis(2-ethylhexanoate), dibutyltin dilaurate, dibutyltin maleate, dibutyltin bis(benzylmaleate), dibutyltin bis(2-ethylhexylmaleate), di-n-octyltin diacetate, di-n-octyltin bis(n-octanoate), di-n-octyltin (2-ethylhexanoate), di-n-octyltin dilaurate, di-n-octyltin maleate, di-n-octyltin bis(benzylmaleate), di-n-octyltin bis(2-ethylhexylmaleate) and the like.

Of these, iron tris(2-ethylhexanoate), bismuth tris(2-ethylhexanoate), aluminum tris(2-ethylhexanoate), aluminum tris(stearate), tin bis(2-ethylhexanoate), zirconium oxide bis(2-ethylhexanoate), zirconium oxide bis(oleate), di-n-octyltin bis(2-ethylhexylmaleate) and the like are preferable.

It is preferable that the alkoxide or the acetylacetonato complex salt of a metal element is one having a metal contained in groups 4, 8, 12, 13, 14 and 15 in the periodic table, and specific examples thereof include alkoxides or acetylacetonato complex salts of titanium such as tetramethoxytitanium, tetraethoxytitanium, tetra-n-propoxytitanium, tetra-i-propoxytitanium, tetra-n-butoxytitanium, a tetra-n-butoxytitanium oligomer, tetra-sec-butoxytitanium, tetra-tert-butoxytitanium, tetra(2-ethylhexyloxy)titanium, bis(2-ethylhexyloxy)titanium bis(octanediolate), tetrakis(2-ethylhexyloxy)titanium, titanium tetra-(octanediolate), titanium lactate, titanium dipropoxybis(triethanolaminate), titanium dibutoxybis(triethanolaminate), titanium tributoxystearate, titanium tripropoxystearate, titanium tripropoxyacetylacetonate, titanium dipropoxybis(acetylacetonate), titanium tripropoxyethylacetoacetate, titanium propoxyacetylacetonatobis(ethylacetoacetate), titanium tributoxyacetylacetonate, titanium dibutoxybis(acetylacetonate), titanium tributoxyethylacetoacetate, titanium butoxyacetylacetonatobis(ethylacetoacetate), titanium tetrakis(acetylacetonate), titanium diacetylacetonatobis(ethylacetoacetate), alkoxides or acetylacetonato complex salts of zirconium such as tetraethoxyzirconium, tetra-n-propoxyzirconium, tetra-i-propoxyzirconium, tetra-n-butoxyzirconium, tetra-sec-butoxyzirconium, tetra-tert-butoxyzirconium, tetra(2-ethylhexyl)zirconium, zirconium tributoxystearate, zirconium tributoxyacetylacetonate, zirconium dibutoxybis(acetylacetonate), zirconium tributoxyethylacetoacetate, zirconium butoxyacetylacetonatobis(ethylacetoacetate), zirconium tetrakis(acetylacetonate) and zirconium diacetylacetonatobis(ethylacetoacetate), alkoxides or acetylacetonato complex salts of aluminum such as triethoxyaluminum, tri-n-propoxyaluminum, tri-i-propoxyaluminum, tri-n-butoxyaluminum, tri-sec-butoxyaluminum, tri-tert-butoxyaluminum, tri(2-ethylhexyl)aluminum, aluminum dibutoxystearate, aluminum dibutoxyacetylacetonate, aluminum butoxybis(acetylacetonate), aluminum dibutoxyethylacetoacetate, aluminum tris(acetylacetonate) and aluminum tris-(ethylacetoacetate), and the like.

Of these, tetraethoxytitanium, tetraethoxyzirconium and the like are preferable.

The content of such component (B) is preferably from 0.5 to 5 parts by mass based on 100 parts by mass of component (C) composed of silica. When the content of the component (B) is excessively small, the improvement width of impact resilience is decreased. On the other hand, when the content of the component (B) is excessively large, there is a possibility that thermal stability is deteriorated.

<Component (C)>

In the rubber composition of the present invention, a component (C) composed of granular silica as a filler is usually contained. Although the silica may be any as long as it is generally used as the filler, it is preferably synthetic silicic acid having a primary particle size of 50 nm or less.

The content of such component (C) is preferably from 20 to 100 parts by mass based on 100 parts by mass of the total of the component (A) and the component (D) described later. When the content of the component (C) is either excessively small or excessively large, a balance between hardness and rolling resistance is deteriorated.

<Component (D)>

In the rubber composition of the present invention, a polymer (hereinafter referred to as a functional group-free polymer) having no functional group that bonds to a silanol group in silica, as the component (D), constitutes the rubber component, together with the conjugated diene polymer having specific functional group as the component (A).

Herein, the groups that are bondable to a silanol group in silica include the specific functional groups, a primary amino group, a secondary amino group, a hydrocarbyloxysilyl group and the like.

As such a functional group-free polymer, there can be used natural rubber, butadiene rubber, synthetic isoprene rubber, styrene-butadiene rubber or the like.

It is preferable that the content of such component (D) is 40 parts by mass or less, and it is more preferable that the content is from 10 to 35 parts by mass, based on 100 parts by mass of the total of component (A) and component (D). When the content of component (D) is excessively large, there is a possibility that rolling resistance is deteriorated.

<Other Components>

In the rubber composition of the present invention, other components may be contained in addition to the above-mentioned component (A) to component (D), if necessary. Such other components include reinforcing agents such as carbon black, softening agents such as oil, silane coupling agents, waxes, antioxidants, stearic acid, zinc oxide, vulcanizing agents or crosslinking agents such as sulfur, vulcanization accelerators and the like.

<Rubber Composition>

The rubber composition of the present invention can be prepared by kneading the above-mentioned respective components, for example, by using a kneader such as a plastomill, a Banbury mixer, a roll mill or an internal mixer. However, it is preferable to knead the functional group-free polymer as the component (D), a part or the whole of silica as the component (C) and the metal-containing acylate compound as the component (B), and thereafter to add the specific functional group-containing conjugated diene polymer as the component (A) or the specific functional group-containing conjugated diene polymer as the component (A) and the remainder of silica as component (C) to the resulting kneaded material, followed by kneading.

According to such a method, a balance between impact resilience and rolling resistance of a tire obtained is improved.

According to the rubber composition of the present invention, since the conjugated diene polymer containing the specific functional group bondable to silica is contained as the rubber component, the specific functional group in conjugated diene polymer containing the specific functional group bonds to the silanol group in silica, thereby improving dispersibility of silica. Moreover, since the catalyst for condensing silanol is contained, the silanol groups in the silica are condensed among the silica particles, thereby forming the silica aggregate. As a result, silica is suppressed from being excessively dispersed. Therefore, the elastic body having small rolling resistance and moreover excellent impact resilience can be obtained.

Accordingly, the rubber composition of the present invention is suitable as a rubber composition for obtaining a tire tread.

<Tire>

The tire of the present invention has the tread obtained from the above-mentioned rubber composition. This tire is produced by a usual method using the above-mentioned rubber composition.

Namely, for example, the rubber composition (uncrosslinked rubber composition) of the present invention is extruded according to the shape of the tire to be molded (specifically, the shape of the tread) to perform molding on a tire molding machine by a usual method, thereby producing an uncrosslinked molded body for tire use. The tread is produced, for example, by heating and pressurizing this uncrosslinked molded body for tire use in a vulcanizing machine, and the tread and other parts are assembled, by which the desired tire can be produced.

The tire of the present invention has the tread obtained from the above-mentioned rubber composition, so that it has small rolling resistance, and moreover, has excellent impact resilience.

EXAMPLES

Although specific examples of the present invention will be described below, the present invention is not construed as being limited to these examples.

In the following Examples and Comparative Examples, measuring methods of various physical property values are as follows:

(1) The contained ratio (hereinafter also referred to as the "bonded styrene content") of structural units derived from an aromatic vinyl compound (styrene) in the conjugated diene polymer containing specific functional group:

Calculated from the 500 MHz, $^1$H-NMR spectrum using deuterated chloroform as a solvent.

(2) The content (hereinafter also referred to as the "vinyl bond content") of 1,2-vinyl bonds in the structural unit derived from a conjugated diene compound in the conjugated diene polymer containing the specific functional group:

Calculated from the 500 MHz, $^1$H-NMR spectrum.

(3) Glass Transition Temperature (Tg):

Measured by differential scanning calorimetry (DSC) in accordance with ASTM D3418.

(4) Molecular Weight of Base Polymer Involved in the Conjugated Diene Polymer containing the Specific Functional Group:

Measurement was made by gel permeation chromatography (GPC), "HLC-8120GPC" (manufactured by Tosoh Corporation) under the following conditions, and the polystyrene-converted weight average molecular weight (Mw) was determined from the retention time corresponding to the maximum peak height of a GPC curve obtained.

(GPC Conditions)

Column: Trade name "GMHHXL" (manufactured by Tosoh Corporation), 2 columns

Column temperature: 40° C.

Mobile phase: Tetrahydrofuran

Flow rate: 1.0 ml/min

Sample concentration: 10 mg/20 ml (5) Mooney Viscosity:

Measured in accordance with JIS K6300 with using an L-rotor under conditions of preheating for 1 minute, rotor operation for 4 minutes and a temperature of 100° C.

[Synthesis of Conjugated Diene Polymer Containing Specific Functional Group]

Synthesis Example 1

Firstly, an autoclave reactor having an internal volume of 5 liters in which the atmosphere was replaced with nitrogen was charged with 2,750 g of cyclohexane as a solvent, 50 g of tetrahydrofuran as an adjuster for adjusting the vinyl bond content, 125 g of styrene as a monomer and 375 g of 1,3-butadiene. After adjusting the temperature in the reactor to 10° C., a cyclohexane solution containing 5.80 mmol of n-butyllithium was added as a polymerization initiator to initiate polymerization. The polymerization was conducted under adiabatic conditions, and the maximum temperature reached 85° C.

After confirmation that the polymerization conversion reached 99%, the polymerization was further conducted for 5 minutes from the time when the polymerization conversion reached 99%. Thereafter, 10 g was collected from a reaction solution obtained, namely a polymer solution containing a copolymer composed of a conjugated diene compound and an aromatic vinyl compound, for measurement of the molecular weight (for measurement of the molecular weight of a base polymer).

Then, a cyclohexane solution containing 4.96 mmol of 1-[3-(triethoxysilyl)-propyl]-4-methylpiperazine (hereinafter referred to as "compound (1) containing specific functional group") was added to the polymer solution, followed by reaction for 15 minutes. Thereafter, 2 g of 2,6-di-tert-butyl-p-cresol was added to a polymer solution obtained, and further, a desolvation treatment was performed by steam stripping with using hot water adjusted to pH 9 with sodium hydroxide. Then, a drying treatment was performed with a hot roll controlled to 110° C. to obtain a conjugated diene polymer (hereinafter referred to as "polymer (A1)") containing a specific functional group.

The bonded styrene content, vinyl bond content, glass transition temperature and Mooney viscosity of polymer (A1) obtained and the weight average molecular weight of the base polymer are shown in the following Table 1.

Synthesis Example 2

A conjugated diene polymer (hereinafter referred to as "polymer (A2)") containing a specific functional group was obtained in the same manner as in Synthesis Example 1 with the exception that 4.96 mmol of N,N',N'-tris(trimethylsilyl)-N-(2-aminoethyl)-3-aminopropyltriethoxysilane (hereinafter referred to as "compound (2) containing a specific functional group") was used in place of the compound (1) containing a specific functional group.

The bonded styrene content, vinyl bond content, glass transition temperature and Mooney viscosity of polymer (A2) obtained and the weight average molecular weight of the base polymer are shown in the following Table 1.

Synthesis Example 3

A conjugated diene polymer (hereinafter referred to as "polymer (A3)") containing a specific functional group was obtained in the same manner as in Synthesis Example 1 with the exception that 4.96 mmol of [3-(diethylamino)propyltrimethoxysilane (hereinafter referred to as "compound (3) containing a specific functional group") was used in place of the compound (1) containing the specific functional group.

The bonded styrene content, vinyl bond content, glass transition temperature and Mooney viscosity of polymer (A3) obtained and the weight average molecular weight of the base polymer are shown in the following Table 1.

Synthesis Example 4

A conjugated diene polymer (hereinafter referred to as "polymer (A4)") was obtained in the same manner as in Synthesis Example 1 with the exception that 4.96 mmol of S-trimethylsilylmercaptopropyltrimethoxysilane (hereinafter referred to as "compound (4) containing a specific functional group") was used in place of the compound (1) containing the specific functional group.

The bonded styrene content, vinyl bond content, glass transition temperature and Mooney viscosity of polymer (A4) obtained and the weight average molecular weight of the base polymer are shown in the following Table 1.

Synthesis Example 5

A conjugated diene polymer (hereinafter referred to as "polymer (A5)") was obtained in the same manner as in Synthesis Example 1 with the exception that 4.96 mmol of N-(1,3-dimethylbutylidene)-3-(trimethoxysilyl)-1-propaneamine (hereinafter referred to as "compound (5) containing specific functional group") was used in place of specific functional group-containing compound (1).

The bonded styrene content, vinyl bond content, glass transition temperature and Mooney viscosity of polymer (A5) obtained and the weight average molecular weight of the base polymer are shown in the following Table 1.

Synthesis Example 6 (for Comparison)

A conjugated diene polymer for comparison (hereinafter referred to as "polymer (A6)") was obtained in the same manner as in Synthesis Example 1 with the exception that 4.96 mmol of N,N-bis(trimethylsilyl)aminopropylmethyldimethoxysilane (hereinafter referred to as "compound (1) containing a functional group for comparison") was used in place of the compound (1) specific functional group.

The bonded styrene content, vinyl bond content, glass transition temperature and Mooney viscosity of polymer (A6) obtained and the weight average molecular weight of the base polymer are shown in the following Table 1.

Synthesis Example 7 (for Comparison)

A conjugated diene polymer for comparison (hereinafter referred to as "polymer (A7)") was obtained in the same manner as in Synthesis Example 1 with the exception that 4.96 mmol of 3-(4-trimethylsilyl)-1-piperadino)propyltriethoxysilane (hereinafter referred to as "compound (2) containing a functional group for comparison") was used in place of the compound (1) containing the specific functional group.

The bonded styrene content, vinyl bond content, glass transition temperature and Mooney viscosity of polymer (A7) obtained and the weight average molecular weight of the base polymer are shown in the following Table 1.

Synthesis Example 8 (for Comparison)

A conjugated diene polymer (hereinafter referred to as "polymer (A8)") was obtained in the same manner as in Synthesis Example 1 with the exception that 4.96 mmol of methanol was used in place of the compound (1) containing the specific functional group.

The bonded styrene content, vinyl bond content, glass transition temperature and Mooney viscosity of polymer (A8) obtained and the weight average molecular weight of the base polymer are shown in the following Table 1.

"rubber component (1)". Further, the Mooney viscosity of rubber component (1) is shown in the following table 2.

Example 2

A rubber composition was produced in the same manner as in Example 1 with the exception that 80 parts by mass of

TABLE 1

|  |  | Synthesis Example 1 | Synthesis Example 2 | Synthesis Example 3 | Synthesis Example 4 | Synthesis Example 5 | Synthesis Example 6 | Synthesis Example 7 | Synthesis Example 8 |
|---|---|---|---|---|---|---|---|---|---|
| Raw Material | Styrene (g) | 125 | 125 | 125 | 125 | 125 | 125 | 125 | 125 |
|  | 1,3-Butadiene (g) | 375 | 375 | 375 | 375 | 375 | 375 | 375 | 375 |
|  | Compound (1) Containing Specific Functional Group (mmol) | 4.96 |  |  |  |  |  |  |  |
|  | Compound (2) Containing Specific Functional Group (mmol) |  | 4.96 |  |  |  |  |  |  |
|  | Compound (3) Containing Specific Functional Group (mmol) |  |  | 4.96 |  |  |  |  |  |
|  | Compound (4) Containing Specific Functional Group (mmol) |  |  |  | 4.96 |  |  |  |  |
|  | Compound (5) Containing Specific Functional Group (mmol) |  |  |  |  | 4.96 |  |  |  |
|  | Compound (1) Containing a Functional Group for Comparison (mmol) |  |  |  |  |  | 4.96 |  |  |
|  | Compound (2) Containing a Functional Group for Comparison (mmol) |  |  |  |  |  |  | 4.96 |  |
|  | Methanol (mmol) |  |  |  |  |  |  |  | 4.96 |
| Property | Bonded Styrene Content (mass %) | 25 | 25 | 25 | 25 | 25 | 25 | 25 | 25 |
|  | Vinyl Bond Content (mol %) | 55 | 54 | 56 | 55 | 54 | 56 | 55 | 55 |
|  | Glass transition Temperature (° C.) | −30 | −30 | −30 | −30 | −30 | −30 | −31 | −30 |
|  | Weight Average Molecular Weight of Base Polymer | 200,000 | 200,000 | 200,000 | 200,000 | 200,000 | 200,000 | 200,000 | 200,000 |
|  | Mooney Viscosity | 23 | 24 | 22 | 8 | 28 | 8 | 28 | 9 |

Example 1

With using a plastomill (internal volume: 250 cc) equipped with a temperature controller, a rubber composition of the present invention was produced in the following manner.

Eighty parts by mass of polymer (A1) as the component (A), 1 part by mass of iron tris(2-ethylhexanoate) as the component (B), 80 parts by mass of silica (manufactured by Tosoh Silica Corporation, product name: "Nipsil AQ", primary average particle size: 15 nm) as the component (C), 20 parts by mass of butadiene rubber (manufactured by JSR Corporation, product name: "BR01"), 45 parts by mass of an extender oil (manufactured by Sankyo Yuka Kogyo K.K., product name: "SNH46"), 6.7 parts by mass of carbon black, 10 parts by mass of a silane coupling agent (manufactured by Degussa AG, product name: "Si69"), 2.4 parts by mass of stearic acid, 1.2 parts by mass of an antioxidant (manufactured by Ouchi Shinko Chemical Industrial Co., Ltd., product name: "Nocrac 810NA") and 3.6 parts by mass of zinc oxide (zinc white) were kneaded under conditions of a rotation number of 60 rpm and a filling rate of 72% for 10 minutes.

Then, a kneaded material obtained was cooled to room temperature, and thereafter, 2.2 parts by mass of a vulcanization accelerator, "Nocceler CZ" (manufactured by Ouchi Shinko Chemical Industrial Co., Ltd.), 1.8 parts by mass of a vulcanization accelerator, "Nocceler D" (manufactured by Ouchi Shinko Chemical Industrial Co., Ltd.), and 1.8 parts by mass of sulfur were added to the kneaded material, and kneaded under conditions of a rotation number of 60 rpm and a temperature of 110° C. for 4 minutes to produce a rubber composition. The resulting rubber composition is taken as polymer (A2) was used as component (A) in place of polymer (A1). The resulting rubber composition is taken as "rubber composition (2)".

Example 3

A rubber composition was produced in the same manner as in Example 1 with the exception that 80 parts by mass of polymer (A3) was used as component (A) in place of polymer (A1). The resulting rubber composition is taken as "rubber composition (3)".

Example 4

A rubber composition was produced in the same manner as in Example 1 with the exception that 80 parts by mass of polymer (A4) was used as component (A) in place of polymer (A1). The resulting rubber composition is taken as "rubber composition (4)".

Example 5

A rubber composition was produced in the same manner as in Example 1 with the exception that 80 parts by mass of polymer (A5) was used as component (A) in place of polymer (A1). The resulting rubber composition is taken as "rubber composition (5)".

Example 6

A rubber composition was produced in the same manner as in Example 1 with the exception that 1 part by mass of bismuth tris(2-ethylhexanoate) was used as component (B) in place of iron tris(2-ethylhexanoate). The resulting rubber composition is taken as "rubber composition (6)".

Example 7

A rubber composition was produced in the same manner as in Example 1 with the exception that 1 part by mass of zirconium oxide bis(2-ethylhexanoate) was used as component (B) in place of iron tris(2-ethylhexanoate). The resulting rubber composition is taken as "rubber composition (7)".

Example 8

A rubber composition was produced in the same manner as in Example 1 with the exception that 1 part by mass of tetraethoxyzirconium was used as component (B) in place of iron tris(2-ethylhexanoate). The resulting rubber composition is taken as "rubber composition (8)".

Example 9

With using a plastomill (internal volume: 250 cc) equipped with a temperature controller, a rubber composition of the present invention was produced in the following manner.

One part by mass of iron tris(2-ethylhexanoate), 84 parts by mass of silica (manufactured by Tosoh Silica Corporation, product name: "Nipsil AQ", primary average particle size: 15 nm), 30 parts by mass of butadiene rubber (manufactured by JSR Corporation, product name: "BR01"), 45 parts by mass of an extender oil (manufactured by Sankyo Yuka Kogyo K.K., product name: "SNH46"), 6.7 parts by mass of carbon black, 10 parts by mass of a silane coupling agent (manufactured by Degussa AG, product name: "Si69"), 2.4 parts by mass of stearic acid, 1.2 parts by mass of an antioxidant (manufactured by Ouchi Shinko Chemical Industrial Co., Ltd., product name: "Nocrac 810NA") and 3.6 parts by mass of zinc oxide (zinc white) were kneaded under conditions of a rotation number of 60 rpm and a filling rate of 72% for 5 minutes. Thereafter, 80 parts by mass of polymer (A1) was added to a kneaded material obtained, and kneaded under kneading conditions of a rotation number of 60 rpm and a temperature of 120° C. for 5 minutes.

Then, a kneaded material obtained was cooled to room temperature, and thereafter, 1.8 parts by mass of a vulcanization accelerator, "Nocceler CZ" (manufactured by Ouchi Shinko Chemical Industrial Co., Ltd.), 1.8 parts by mass of a vulcanization accelerator, "Nocceler D" (manufactured by Ouchi Shinko Chemical Industrial Co., Ltd.), and 1.8 parts by mass of sulfur were added to the kneaded material, and kneaded under conditions of a rotation number of 60 rpm and a temperature of 80° C. for 1 minute to produce a rubber composition. The resulting rubber composition is taken as "rubber component (9)".

Comparative Example 1

A rubber composition was produced in the same manner as in Example 1 with the exception that iron tris(2-ethylhexanoate) was not used. The resulting rubber composition is taken as "rubber composition (10)".

Comparative Example 2

A rubber composition was produced in the same manner as in Example 1 with the exception that 80 parts by mass of polymer (A6) was used in place of polymer (A1). The resulting rubber composition is taken as "rubber composition (11)".

Comparative Example 3

A rubber composition was produced in the same manner as in Example 1 with the exception that 80 parts by mass of polymer (A7) was used in place of polymer (A1). The resulting rubber composition is taken as "rubber composition (12)".

Comparative Example 4

A rubber composition was produced in the same manner as in Example 1 with the exception that 80 parts by mass of polymer (A8) was used in place of polymer (A1). The resulting rubber composition is taken as "rubber composition (13)".

Comparative Example 5

With using a plastomill (internal volume: 250 cc) equipped with a temperature controller, a rubber composition of the present invention was produced in the following manner.

One part by mass of iron tris(2-ethylhexanoate), 84 parts by mass of silica (manufactured by Tosoh Silica Corporation, product name: "Nipsil AQ", primary average particle size: 15 nm), 30 parts by mass of butadiene rubber (manufactured by JSR Corporation, product name: "BR01"), 45 parts by mass of an extender oil (manufactured by Sankyo Yuka Kogyo K.K., product name: "SNH46"), 6.7 parts by mass of carbon black, 10 parts by mass of a silane coupling agent (manufactured by Degussa AG, product name: "Si69"), 2.4 parts by mass of stearic acid, 1.2 parts by mass of an antioxidant (manufactured by Ouchi Shinko Chemical Industrial Co., Ltd., product name: "Nocrac 810NA") and 3.6 parts by mass of zinc oxide (zinc white) were kneaded under conditions of a rotation number of 60 rpm and a filling rate of 72% for 5 minutes. Thereafter, 80 parts by mass of polymer (A6) was added to a kneaded material obtained, and kneaded under kneading conditions of a rotation number of 60 rpm and a temperature of 120° C. for 5 minutes.

Then, a kneaded material obtained was cooled to room temperature, and thereafter, 1.8 parts by mass of a vulcanization accelerator, "Nocceler CZ" (manufactured by Ouchi Shinko Chemical Industrial Co., Ltd.), 1.8 parts by mass of a vulcanization accelerator, "Nocceler D" (manufactured by Ouchi Shinko Chemical Industrial Co., Ltd.), and 1.8 parts by mass of sulfur were added to the kneaded material, and kneaded under conditions of a rotation number of 60 rpm and a temperature of 80° C. for 1 minute to produce a rubber composition. The resulting rubber composition is taken as "rubber component (14)".

(Evaluation of Rubber Composition)

After rubber composition (1) to rubber composition (14) were each molded, they were heat treated under conditions of 160° C. with using a vulcanizing press to prepare rubber elastic bodies. For these rubber elastic bodies, the following characteristic evaluations were performed. The results thereof are shown in the following Table 2.

(1) Impact Resilience:

With using a tripso type impact resilience test (manufactured by Toyo Seiki Seisakusho, Ltd.), measurement was carried out under conditions of 50° C., and the index at the time when the value of the rubber elastic body according to Comparative Example 1 was taken as 100 was determined. The larger value of this index shows the larger and better impact resilience.

(2) Wet Skid Resistance (0° C., Tan δ):

With using a dynamic spectrometer (manufactured by US Rheometric Inc.), measurement was carried out under conditions of a tensile dynamic distortion of 0.14%, an angular velocity of 100 radians per second and a temperature of 0° C., and the index at the time when the value of the rubber elastic body according to Comparative Example 1 was taken as 100 was determined. The larger value of this index shows the larger and better wet skid resistance.

(3) Low Hysteresis Loss Property (70° C., Tan δ):

With using a dynamic spectrometer (manufactured by US Rheometric Inc.), measurement was carried out under conditions of a tensile dynamic distortion of 0.7%, an angular velocity of 100 radians per second and a temperature of 70° C., and the index at the time when the value of the rubber elastic body according to Comparative Example 1 was taken as 100 was determined. The larger value of this index shows the larger and better low hysteresis loss property.

TABLE 2

|  |  | Example 1 | Example 2 | Example 3 | Example 4 | Example 5 | Example 6 | Example 7 |
|---|---|---|---|---|---|---|---|---|
| Formulation of Rubber Composition | Polymer (A1) (parts by mass) | 80 |  |  |  |  | 80 | 80 |
|  | Polymer (A2) (parts by mass) |  | 80 |  |  |  |  |  |
|  | Polymer (A3) (parts by mass) |  |  | 80 |  |  |  |  |
|  | Polymer (A4) (parts by mass) |  |  |  | 80 |  |  |  |
|  | Polymer (A5) (parts by mass) |  |  |  |  | 80 |  |  |
|  | Polymer (A6) (parts by mass) |  |  |  |  |  |  |  |
|  | Polymer (A7) (parts by mass) |  |  |  |  |  |  |  |
|  | Polymer (A8) (parts by mass) |  |  |  |  |  |  |  |
|  | Butadiene Rubber (parts by mass) | 20 | 20 | 20 | 20 | 20 | 20 | 20 |
|  | Iron Tris(2-ethylhexanoate) (parts by mass) | 1 | 1 | 1 | 1 | 1 |  |  |
|  | Bismuth Tris(2-ethylhexanoate) (parts by mass) |  |  |  |  |  | 1 |  |
|  | Zirconium Oxide Bis(2-ethylhexanoate) (parts by mass) |  |  |  |  |  |  | 1 |
|  | Tetraethoxyzirconium (parts by mass) |  |  |  |  |  |  |  |
|  | Silica (parts by mass) | 80 | 80 | 80 | 80 | 80 | 80 | 80 |
|  | Carbon Black (parts by mass) | 6.7 | 6.7 | 6.7 | 6.7 | 6.7 | 6.7 | 6.7 |
|  | Extender Oil (parts by mass) | 45 | 45 | 45 | 45 | 45 | 45 | 45 |
|  | Silane Coupling Agent (parts by mass) | 10 | 10 | 10 | 10 | 10 | 10 | 10 |
|  | Stearic Acid (parts by mass) | 2.4 | 2.4 | 2.4 | 2.4 | 2.4 | 2.4 | 2.4 |
|  | Antioxidant (parts by mass) | 1.2 | 1.2 | 1.2 | 1.2 | 1.2 | 1.2 | 1.2 |
|  | Zinc Oxide (parts by mass) | 3.6 | 3.6 | 3.6 | 3.6 | 3.6 | 3.6 | 3.6 |
|  | Vulcanization Accelerator "Nocceler CZ" (parts by mass) | 2.2 | 2.2 | 2.2 | 2.2 | 2.2 | 2.2 | 2.2 |
|  | Vulcanization Accelerator "Nocceler D" (parts by mass) | 1.8 | 1.8 | 1.8 | 1.8 | 1.8 | 1.8 | 1.8 |
|  | Sulfur (parts by mass) | 1.8 | 1.8 | 1.8 | 1.8 | 1.8 | 1.8 | 1.8 |
| Evaluation Results | Impact Resilience | 121 | 119 | 119 | 120 | 119 | 120 | 119 |
|  | Wet Skid Resistance (0° C., tan δ) | 108 | 109 | 107 | 111 | 110 | 108 | 110 |
|  | Low Hysteresis Loss Property (70° C., tan δ) | 105 | 106 | 108 | 108 | 109 | 107 | 109 |

|  |  | Example 8 | Example 9 | Comparative Example 1 | Comparative Example 2 | Comparative Example 3 | Comparative Example 4 | Comparative Example 5 |
|---|---|---|---|---|---|---|---|---|
| Formulation of Rubber Composition | Polymer (A1) (parts by mass) | 80 | 80 | 80 |  |  |  |  |
|  | Polymer (A2) (parts by mass) |  |  |  |  |  |  |  |
|  | Polymer (A3) (parts by mass) |  |  |  |  |  |  |  |
|  | Polymer (A4) (parts by mass) |  |  |  |  |  |  |  |
|  | Polymer (A5) (parts by mass) |  |  |  |  |  |  |  |
|  | Polymer (A6) (parts by mass) |  |  |  | 80 |  |  | 80 |
|  | Polymer (A7) (parts by mass) |  |  |  |  | 80 |  |  |
|  | Polymer (A8) (parts by mass) |  |  |  |  |  | 80 |  |
|  | Butadiene Rubber (parts by mass) | 20 | 20 | 20 | 20 | 20 | 20 | 20 |
|  | Iron Tris(2-ethylhexanoate) (parts by mass) |  | 1 |  | 1 | 1 | 1 | 1 |
|  | Bismuth Tris(2-ethylhexanoate) (parts by mass) |  |  |  |  |  |  |  |
|  | Zirconium Oxide Bis(2-ethylhexanoate) (parts by mass) |  |  |  |  |  |  |  |
|  | Tetraethoxyzirconium (parts by mass) | 1 |  |  |  |  |  |  |
|  | Silica (parts by mass) | 80 | 80 | 80 | 80 | 80 | 80 | 80 |

TABLE 2-continued

|  |  |  |  |  |  |  |  |  |
|---|---|---|---|---|---|---|---|---|
|  | Carbon Black (parts by mass) | 6.7 | 6.7 | 6.7 | 6.7 | 6.7 | 6.7 | 6.7 |
|  | Extender Oil (parts by mass) | 45 | 45 | 45 | 45 | 45 | 45 | 45 |
|  | Silane Coupling Agent (parts by mass) | 10 | 10 | 10 | 10 | 10 | 10 | 10 |
|  | Stearic Acid (parts by mass) | 2.4 | 2.4 | 2.4 | 2.4 | 2.4 | 2.4 | 2.4 |
|  | Antioxidant (parts by mass) | 1.2 | 1.2 | 1.2 | 1.2 | 1.2 | 1.2 | 1.2 |
|  | Zinc Oxide (parts by mass) | 3.6 | 3.6 | 3.6 | 3.6 | 3.6 | 3.6 | 3.6 |
|  | Vulcanization Accelerator "Nocceler CZ" (parts by mass) | 2.2 | 2.2 | 2.2 | 2.2 | 2.2 | 2.2 | 2.2 |
|  | Vulcanization Accelerator "Nocceler D" (parts by mass) | 1.8 | 1.8 | 1.8 | 1.8 | 1.8 | 1.8 | 1.8 |
|  | Sulfur (parts by mass) | 1.8 | 1.8 | 1.8 | 1.8 | 1.8 | 1.8 | 1.8 |
| Evaluation Results | Impact Resilience | 115 | 120 | 100 | 102 | 101 | 99 | 115 |
|  | Wet Skid Resistance (0° C., tan δ) | 105 | 105 | 100 | 105 | 104 | 85 | 104 |
|  | Low Hysteresis Loss Property (70° C., tan δ) | 106 | 106 | 100 | 106 | 104 | 84 | 105 |

As apparent from the results of Table 2, it has been confirmed that the rubber elastic bodies having small rolling resistance and moreover excellent impact resilience are obtained according to the rubber compositions of Examples 1 to 9.

The invention claimed is:

1. A method for producing a rubber composition, the method comprising kneading:
  a rubber component comprising a conjugated diene polymer having at least one functional group selected from the group consisting of a thiol group, an oxetane group and a hydrocarbylthio group;
  silica particles; and
  a catalyst for condensing silanol of the silica particles to form an aggregate of the silica particles.

2. The method according to claim 1, wherein at least one polymer selected from the group consisting of a conjugate diene polymer having no functional group bondable to silica, and a polymer having no functional group bondable to silica, the polymer being other than conjugated diene polymer is also kneaded as a rubber component other than the conjugated diene polymer.

3. The method according to claim 2, wherein the at least one polymer, a part or the whole of the silica particles, and the catalyst are initially kneaded to add the conjugated diene polymer thereto, followed by kneading.

4. The method according to claim 1, wherein the catalyst includes an acylate compound comprising iron, an alkoxide comprising iron, or an acetylacetonate complex salt of iron.

5. The method according to claim 4, wherein a content of the catalyst is from 0.5 to 5 parts by mass based on 100 parts by mass of the silica particles.

6. The method according to claim 1, wherein a content of the catalyst is from 0.5 to 5 parts by mass based on 100 parts by mass of the silica particles.

7. The method according to claim 1, wherein a content of the silica particles is preferably from 20 to 100 parts by mass based on 100 parts by mass of a total of the conjugated diene polymer and the at least one polymer.

8. A rubber composition obtained by kneading:
  a rubber component comprising a conjugated diene polymer having at least one functional group selected from the group consisting of a thiol group, an oxetane group and a hydrocarbylthio group;
  silica particles; and
  a catalyst for condensing silanol of the silica particles to form an aggregate of the silica particles.

9. The rubber composition according to claim 8, which is obtained by kneading at least one polymer selected from the group consisting of a conjugate diene polymer having no functional group bondable to silica, and a polymer having no functional group bondable to silica, the polymer being other than conjugated diene polymer, as a rubber component other than the conjugated diene polymer, together with the conjugated diene polymer, the catalyst and the silica particles.

10. The rubber composition according to claim 9, which is obtained by initially kneading the at least one polymer, a part or the whole of the silica particles, and the catalyst to add the conjugated diene polymer thereto, followed by the kneading.

11. A kneaded rubber composition comprising:
  silica particles;
  a catalyst for condensing silanol of the silica particles to form an aggregate of the silica particles; and
  a rubber component comprising a conjugated diene polymer having at least one functional group selected from the group consisting of a thiol group, an oxetane group and a hydrocarbylthio group.

12. A tire, comprising a tread obtained from the rubber composition according to claim 8.

13. A tire, comprising a tread obtained from the rubber composition according to claim 9.

14. A tire, comprising a tread obtained from the rubber composition according to claim 10.

15. A tire, comprising a tread obtained from the kneaded rubber composition according to claim 11.

* * * * *